US010875515B2

(12) United States Patent
Izumoto

(10) Patent No.: US 10,875,515 B2
(45) Date of Patent: Dec. 29, 2020

(54) BRAKING CONTROL DEVICE FOR VEHICLE

(71) Applicant: ADVICS CO., LTD., Kariya (JP)

(72) Inventor: Hiroyuki Izumoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 186 days.

(21) Appl. No.: 16/086,139

(22) PCT Filed: Apr. 18, 2017

(86) PCT No.: PCT/JP2017/015512
§ 371 (c)(1),
(2) Date: Sep. 18, 2018

(87) PCT Pub. No.: WO2017/183617
PCT Pub. Date: Oct. 26, 2017

(65) Prior Publication Data
US 2020/0130666 A1    Apr. 30, 2020

(30) Foreign Application Priority Data

Apr. 19, 2016    (JP) .................................. 2016-083637

(51) Int. Cl.
*B60T 8/17*    (2006.01)
*B60T 13/74*    (2006.01)
(Continued)

(52) U.S. Cl.
CPC .............. *B60T 13/745* (2013.01); *B60T 8/17* (2013.01); *B60T 8/326* (2013.01); *B60T 13/167* (2013.01);
(Continued)

(58) Field of Classification Search
CPC .......... B60T 8/4081; B60T 8/17; B60T 8/326; B60T 8/404; B60T 8/4054; B60T 8/4072;
(Continued)

(56) References Cited

U.S. PATENT DOCUMENTS

2007/0194621 A1*  8/2007  Ishizuka ............... B60T 8/4081
                                                      303/122.12
2007/0216218 A1*  9/2007  Matsushita ............. B60T 7/042
                                                      303/20
(Continued)

FOREIGN PATENT DOCUMENTS

JP    2005119426 A      5/2005
JP    2005132306 A  *   5/2005
JP    2016043788 A      4/2016

OTHER PUBLICATIONS

International Search Report (PCT/ISA/210) dated Jul. 25, 2017, by the Japanese Patent Office as the International Searching Authority for International Application No. PCT/JP2017/015512.

*Primary Examiner* — Bradley T King
*Assistant Examiner* — Stephen M Bowes
(74) *Attorney, Agent, or Firm* — Buchanan Ingersoll & Rooney PC

(57) ABSTRACT

A braking control device comprising: an operation amount acquisition device that obtains an operation amount for a braking operation member; a pressurizing unit that presses a friction member to a rotating member fixed to a wheel using an electric motor; a control that controls output of the electric motor based on the operation amount; a pressing force acquisition device that obtains the actual pressing force of the friction member pressing on the rotating member; and a rotation angle acquisition device that obtains the actual rotation angle of the motor. The control: stores the correlation between the actual pressing force and the actual rotation angle; approximates a function map indicated by a second degree or higher polynominal, based on the correlation; calculates a target rotation angle based on the operation amount and the function map; and controls the electric motor to match actual rotation angle and the target rotation angle.

1 Claim, 8 Drawing Sheets

(51) Int. Cl.
   *B60T 8/32*    (2006.01)
   *B60T 13/16*   (2006.01)
   *B60T 13/62*   (2006.01)
   B60T 7/04     (2006.01)
   B60T 11/20    (2006.01)
   B60T 13/68    (2006.01)

(52) U.S. Cl.
   CPC .............. *B60T 13/62* (2013.01); *B60T 7/042* (2013.01); *B60T 11/20* (2013.01); *B60T 13/686* (2013.01); *B60T 2270/402* (2013.01); *B60T 2270/404* (2013.01); *B60T 2270/82* (2013.01)

(58) Field of Classification Search
   CPC ...... B60T 8/4266; B60T 7/042; B60T 13/745; B60T 13/686; B60T 2270/82; B60T 2270/404
   See application file for complete search history.

(56) References Cited

U.S. PATENT DOCUMENTS

2017/0106846 A1\* 4/2017 Kim .................. B60T 11/232
2018/0273009 A1\* 9/2018 Ishikawa ............... B60T 13/745

\* cited by examiner

BRAKING CONTROL DEVICE FOR VEHICLE

TECHNICAL FIELD

The present invention relates to a braking control device for a vehicle.

BACKGROUND ART

Patent Literature 1 discloses a "structure including a master cylinder which generates a hydraulic pressure in response to a brake operation force of a driver, a wheel cylinder which generates a braking force in each vehicle wheel by setting at least the master cylinder as a hydraulic pressure source, a hydraulic pressure source which is able to supply a hydraulic pressure to the wheel cylinder differently from the master cylinder, a hydraulic pressure controller which is able to appropriately control the wheel cylinder pressure, a plurality of hydraulic pressure supply channels which connect the hydraulic pressure source and each wheel cylinder, and a communication channel which allows the hydraulic pressure supply channels to communicate with each other and includes a normally closed interruption valve, in which the hydraulic pressure controller performs a brake-by-wire control of supplying a brake hydraulic pressure to the wheel cylinder by driving the hydraulic pressure source in response to the brake operation of the driver".

Specifically, when a master cylinder pressure change rate is smaller than −ePo, a solenoid valve is located at an open position and a pump rotates reversely so that the hydraulic pressure of the wheel cylinder decreases. When a determination that the "master cylinder pressure change rate is larger than "0" and smaller than ePo (step 107)" is positive, the pump is stopped and the solenoid valve is located at the closed position so that the hydraulic pressure of the wheel cylinder is maintained. Further, when the determination that the "master cylinder pressure change rate is larger than "0" and smaller than ePo" is negative, an isolation valve and the solenoid valve are located at the open position and the pump rotates normally so that the hydraulic pressure of the wheel cylinder increases. Accordingly, even when a pressure generated by the gear pump is not uniform, the hydraulic pressure supplied to the wheel cylinder is equalized on the left and right sides and hence a stable braking operation can be ensured.

As disclosed in Patent Literature 2, the applicant has developed a technique of independently and individually controlling hydraulic pressures of two-system fluid channels (braking pipes) by a pressure adjustment mechanism CLK driven through an electric motor MTR. A case is assumed that this configuration is employed and two electric motors are controlled while the two-system fluid channels are in a communicating state through a communication channel as disclosed in Patent Literature 1. In this case, there is a case in which a difference in rotational angle of two electric motors is generated due to a difference of efficiency or the like of two pressure adjustment mechanisms. Since the rotational angle difference corresponds to the positions of control pistons inside the pressure adjustment mechanisms, it is desirable to suppress the difference in rotational angle of two electric motors.

CITATIONS LIST

Patent Literature

Patent Literature 1: JP 2005-119426 A
Patent Literature 2: JP 2016-043788 A

SUMMARY OF INVENTION

Technical Problems

An object of the invention is to provide a braking control device for a vehicle including two-system fluid channels of which pressures are adjusted by electric motors and capable of suppressing a rotational angle difference between two electric motors when the fluid channels communicate with each other.

Solutions to Problems

A braking control device for a vehicle according to the invention includes: an operation amount sensor (BPA) which detects an operation amount (Bpa) of a braking operation member (BP) of a vehicle; a first wheel cylinder (WC1) which applies a braking torque to one of left and right front wheels of the vehicle; a second wheel cylinder (WC2) which applies a braking torque to the other of the left and right front wheels; a first pressure adjustment mechanism (CA1) which pressurizes a brake fluid inside the first wheel cylinder (WC1) by a first electric motor (MT1); a second pressure adjustment mechanism (CA2) which pressurizes a brake fluid inside the second wheel cylinder (WC2) by a second electric motor (MT2); a communication valve (VRN) which is installed in the course of a communication fluid channel (HRN) connecting the first wheel cylinder (WC1) and the second wheel cylinder (WC2) and selects a communicating state and an interruption state of the brake fluid between the first wheel cylinder (WC1) and the second wheel cylinder (WC2); and a controller (ECU) which calculates first and second target conduction amounts (It1, It2) based on the operation amount (Bpa) and controls the first and second electric motors (MT1, MT2) based on the first and second target conduction amounts (It1, It2). Further, the braking control device for a vehicle includes a first rotational angle sensor (MK1) which detects a first rotational angle (Mk1) of the first electric motor (MT1) and a second rotational angle sensor (MK2) which detects a second rotational angle (Mk2) of the second electric motor (MT2).

In the braking control device for a vehicle according to the invention, when the communication valve (VRN) is in a communicating state and a difference (eMk) between the first rotational angle (Mk1) and the second rotational angle (Mk2) is larger than a prescribed value (mkx), the controller (ECU) performs at least one of an operation of correcting the first or second target conduction amount corresponding to a larger one of the first rotational angle (Mk1) and the second rotational angle (Mk2) to decrease the first or second target conduction amount and an operation of correcting the first or second target conduction amount corresponding to a smaller one of the first rotational angle (Mk1) and the second rotational angle (Mk2) to increase the first or second target conduction amount.

When the communication valve VRN is located at the open position, a rotational angle difference may be generated between the first and second electric motors MT1 and MT2 due to a left-right difference of efficiency or the like between the first and second pressure adjustment mechanisms CA1 and CA2. According to the above-described configuration, the rotational angle difference is suppressed and the positions of first and second control pistons PS1 and PS2 of the first and second pressure adjustment mechanisms CA1 and CA2 are equalized. For this reason, even when the vehicle wheel slip control starts and the communication valve VRN is located at the closed position, it is possible to appropriately adjust the hydraulic pressure by the first and second pressure adjustment mechanisms CA1 and CA2.

DESCRIPTION OF EMBODIMENTS

Embodiments of a braking control device for a vehicle according to the invention will be described with reference to the drawings. In the following description, the suffixes ("fl" and the like) attached to the ends of various symbols indicate the locations of the vehicle wheels corresponding to the symbols. Specifically, "fl" indicates the left front wheel, "fr" indicates the right front wheel, "rl" indicates the left rear wheel, and "rr" indicates the right rear wheel. For example, the wheel cylinders will be written as the left front wheel cylinder WCfl, the right front wheel cylinder WCfr, the left rear wheel cylinder WCrl, and the right rear wheel cylinder WCrr.

Further, the numbers ("1" or "2") attached to the ends of various symbols indicate which one of the left front wheel cylinder WCfl and the right front wheel cylinder WCfr each of two fluid channels (hydraulic pressure systems) is connected to. In the following description, the system connected to the left front wheel cylinder WCfl will be referred to as a "first system" and will be expressed by using the suffix number "1" and the system connected to the right front wheel cylinder WCfr will be referred to as a "second system" and will be expressed by using the suffix number "2". For example, a first pressure adjustment mechanism CA1 is used to adjust the hydraulic pressure of the left front wheel cylinder WCfl (corresponding to the first wheel cylinder WC1) and a second pressure adjustment mechanism CA2 is used to adjust the hydraulic pressure of the right front wheel cylinder WCfr (corresponding to the second wheel cylinder WC2). Additionally, the "first system" and the "second system" may be reversed. In various components, the components involved in the first system (the first fluid channel) are the same as the components involved in the second system (the second fluid channel). For this reason, components involved in the first system will be chiefly described in the following description.

First Embodiment of Braking Control Device According to the Invention

Figure 1:
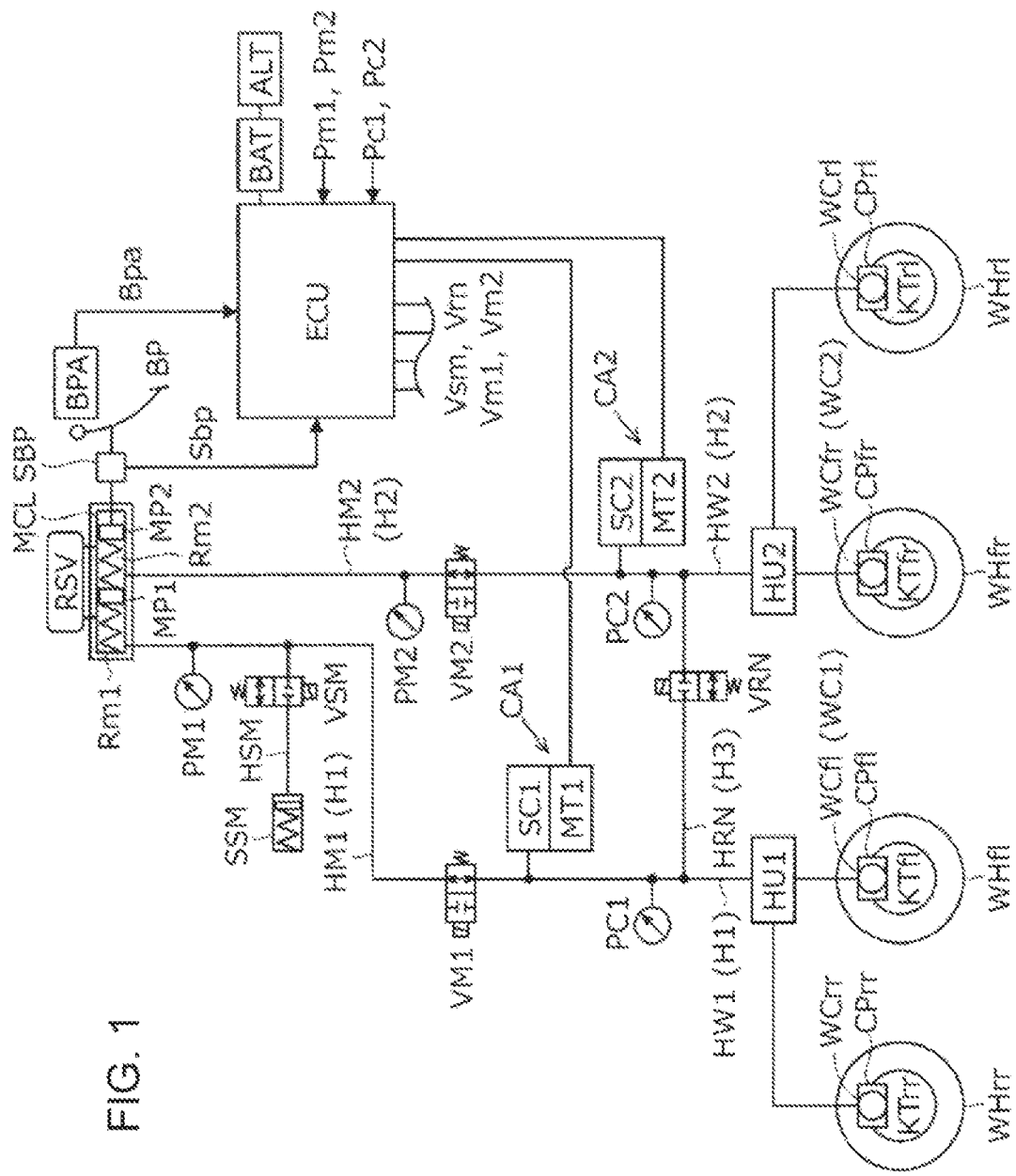
FIG. 1 is an overall configuration diagram illustrating a first embodiment of a braking control device for a vehicle according to the invention.

Referring to the overall configuration diagram of FIG. 1, a vehicle including the braking control device according to a first embodiment of the invention will be described. As illustrated in the overall configuration diagram, the vehicle is provided with a braking operation member BP, an operation amount sensor BPA, an electronic control unit ECU, a tandem master cylinder MCL, a stroke simulator SSM, solenoid valves VM1, VM2, VSM, and VRN, and first and second pressure adjustment mechanisms CA1 and CA2. Further, the vehicle wheels WHfl, WCfr, WHrl, and WHrr of the vehicle are respectively provided with brake calipers CPfl, CPfr, CPrl, and CPrr, the wheel cylinders WCfl, WCfr, WCrl, and WCrr, and rotation members KTfl, KTfr, KTrl, and KTrr.

The braking operation member (for example, the brake pedal) BP is an operation member that reduces the speed of the vehicle by the driver. When the braking operation member BP is operated, a braking torque applied to the vehicle wheel is adjusted and a braking force is generated in the vehicle wheel. Specifically, a rotation member (for example, a brake disc) is fixed to the vehicle wheel of the vehicle. The brake calipers are disposed to sandwich the rotation member therebetween. The brake caliper is provided with the wheel cylinder (WCfl or the like). When the pressure (the hydraulic pressure) of the brake fluid inside each wheel cylinder increases, a friction member (for example, a brake pad) is pressed against the rotation member (for example, the brake disc). Due to the friction generated at this time, the braking torque is generated in the vehicle wheel to thereby generate a braking force.

The braking operation member BP is provided with an operation amount sensor BPA. An operation amount (a braking operation amount) Bpa of the braking operation member BP of the driver is acquired (detected) by the operation amount sensor BPA. Specifically, as the operation amount sensor BPA, at least one of "first and second master cylinder hydraulic pressure sensors (pressure sensors) PM1 and PM2 for acquiring the pressure inside the tandem master cylinder MCL", an "operation displacement sensor (stroke sensor) SBP for acquiring the operation displacement Sbp of the braking operation member BP", and an "operation force sensor (stepping force sensor) FBP (not illustrated) for acquiring an operation force Fbp of the braking operation member BP" can be employed. In other words, the operation amount sensor BPA generally indicates the master cylinder hydraulic pressure sensor, the operation displacement sensor, and the operation force sensor. The braking operation amount Bpa is determined based on at least one of the "first and second master cylinder hydraulic pressures Pm1 and Pm2", the "operation displacement Sbp of the braking operation member BP", and the "operation force Fbp of the braking operation member BP". Here, any one of the first and second master cylinder hydraulic pressure sensors PM1 and PM2 can be omitted.

An electronic control unit (corresponding to a controller) ECU is realized by an electric circuit board having a microprocessor and the like mounted thereon and a control algorithm programmed in the microprocessor. Electric power is supplied from a battery BAT and a generator (alternator) ALT to the electronic control unit ECU. The operation amount Bpa (Pm1, Sbp, or the like) is input to the electronic control unit ECU. Further, the first and second control cylinder hydraulic pressures (detection values) Pc1 and Pc2 acquired by first and second control cylinder hydraulic pressure sensors PC1 and PC2 are input to the electronic control unit ECU. The first and second pressure adjustment mechanisms CA1 and CA2 and the solenoid valves VM1, VM2, VSM, and VRN are controlled by the electronic control unit ECU based on the braking operation amount Bpa.

Specifically, in the electronic control unit ECU, target signals It1 and It2 of electric motors MT1 and MT2 and the command signals Vm1, Vm2, Vsm, and Vrn of the solenoid valves VM1, VM2, VSM, and VRN are calculated according to the control algorithm programmed in the microprocessor. Based on these signals, a process for controlling the electric motors MT1 and MT2 and the solenoid valves VM1, VM2, VSM, and VRN is performed.

The tandem master cylinder (simply, referred to as a master cylinder) MCL converts the operation force of the braking operation member BP into the hydraulic pressure and pressure-feeds a brake fluid to each of the wheel cylinders of the vehicle wheels. Specifically, first and second master cylinder chambers Rm1 and Rm2 which are defined by two master pistons MP1 and MP2 are formed inside the master cylinder MCL and are connected to the wheel cylinders of the vehicle wheels by the fluid channel (the braking pipe). When the braking operation member BP is not operated, the master cylinder chambers Rm1 and Rm2 communicate with a master reservoir RSV so that the hydraulic pressure inside the master cylinder is equal to an atmospheric pressure.

«Two-System Fluid Channels (Diagonal Pipes)»

Next, two-system fluid channels will be described with reference to the hydraulic pressure circuit. A channel (a fluid channel) through which a brake fluid moves between the master cylinder MCL and four wheel cylinders WCfl, WCfr, WCrl, and WCrr is formed as two systems. In one system (a first fluid channel H1), the first master cylinder chamber (referred to as the first hydraulic pressure chamber) Rm1 of the master cylinder MCL is connected to the wheel cylinders WCfl (corresponding to, for example, the first wheel cylinder WC1) and WCrr. In the other system (a second fluid channel H2), the second master cylinder chamber (also referred to as a second hydraulic pressure chamber) Rm2 of the master cylinder MCL is connected to the wheel cylinders WCfr (corresponding to, for example, the second wheel cylinder WC2) and WCrl. A configuration of a so-called diagonal pipe (also referred to as an X-pipe) is employed. Since a configuration according to the first fluid channel (the first braking pipe) H1 and a configuration according to the second fluid channel (the second braking pipe) H2 are basically the same, a configuration according to the first fluid channel H1 will be described.

A first master cylinder interruption valve (also referred to as a first interruption valve) VM1 is provided (installed) in the fluid channel H1 connecting the first hydraulic pressure chamber Rm1 of the master cylinder MCL to the wheel cylinders WCfl and WCrr. The first interruption valve VM1 is a two-position solenoid valve which includes an open position and a closed position. When the first interruption valve VM1 is located at the open position, the first hydraulic pressure chamber Rm1 and the left front wheel cylinder WCfl or the like in a communicating state. Then, when the interruption valve VM1 is located at the closed position, the first hydraulic pressure chamber Rm1 and the left front wheel cylinder WCfl or the like is in the interruption state (the non-communicating state). As the first interruption valve VM1, a normally opened solenoid valve (NO valve) can be employed.

A first hydraulic pressure unit HU1 is installed in a fluid channel HW1 (corresponding to a part of the first fluid channel H1) connecting the first interruption valve VM1 and the wheel cylinders WCfl and WCrr. Here, the first fluid channel (the first braking pipe) H1 includes a fluid channel (the braking pipe) HM1 and the fluid channel (the braking pipe) HW1. The first hydraulic pressure unit HU1 includes a pressure increasing valve and a pressure decreasing valve and individually and independently controls the hydraulic pressure of each of the wheel cylinders WCfl and WCrr during a vehicle wheel slip control such as an anti-skid control and a vehicle stabilization control.

In the fluid channel HW1, the first pressure adjustment mechanism CA1 and the first control cylinder hydraulic pressure sensor (also referred to as a first control hydraulic pressure sensor) PC1 are provided between the first interruption valve VM1 and the first hydraulic pressure unit HU1. The first pressure adjustment mechanism CA1 includes a first control cylinder SC1 and the first electric motor MT1. When the first interruption valve VM1 is located at the closed position, the hydraulic pressure of each of the wheel cylinders WCfl and WCrr is adjusted (increased, maintained, or decreased). The hydraulic pressure Pc1 which is adjusted by the first pressure adjustment mechanism CA1 is acquired (detected) by the first control hydraulic pressure sensor PC1.

The first master cylinder hydraulic pressure sensor PM1 is provided in the fluid channel HM1 (a part of the first fluid channel H1) connecting the first master cylinder chamber Rm1 and the first master cylinder interruption valve VM1. The master cylinder hydraulic pressure Pm1 which is generated by the master cylinder MCL is acquired (detected) by the first master cylinder hydraulic pressure sensor PM1.

The stroke simulator (simply, also referred to as a simulator) SSM is provided in the braking operation member BP to generate an operation force. The simulator interruption valve (also referred to as a simulator valve) VSM is provided in a fluid channel HSM connecting the simulator SSM and the first hydraulic pressure chamber Rm1 of the master cylinder MCL. The simulator valve VSM is a two-position solenoid valve which has an open position and a closed position. When the simulator valve VSM is located at the open position, the first hydraulic pressure chamber Rm1 and the simulator SSM are in a communicating state. Meanwhile, when the simulator valve VSM is located at the closed position, the first hydraulic pressure chamber Rm1 and the simulator SSM are in an interruption state (a non-communicating state). As the simulator interruption valve VSM, a normally closed solenoid valve (NC valve) can be employed.

The simulator SSM includes a piston and an elastic body (for example, a compression spring). The piston is pressed by the brake fluid which flows while moving from the master cylinder MCL (the hydraulic pressure chamber Rm1) to the simulator SSM. A force is applied to the piston in a direction in which the flow of the brake fluid is prevented by the elastic body. An operation force (for example, a brake pedal stepping force) of operating the braking operation member BP is formed by the elastic body.

Next, a configuration according to the second fluid channel H2 will be simply described. As described above, the configuration according to the first fluid channel H1 is basically the same as the configuration according to the second fluid channel H2. Thus, Rm1 corresponds to Rm2, WHfl (corresponding to WC1) corresponds to WCfr (corresponding to WC2), WCrr corresponds to WCrl, HM1 corresponds to HM2, HW1 corresponds to HW2, HU1 corresponds to HU2, VM1 corresponds to VM2, CA1 corresponds to CA2, PM1 corresponds to PM2, and PC1 corresponds to PC2. That is, the description obtained by replacing "first" and the suffix number "1" in the description of the components according to the first fluid channel H1 respectively by "second" and the suffix number "2" corresponds to the description of the component according to the second fluid channel H2. Here, the simulator is omitted in the component according to the second fluid channel H2, but an individual simulator can be also provided in the second fluid channel H2.

Further, a communication fluid channel HRN (a third fluid channel H3) connecting the first fluid channel H1 and the second fluid channel H2 is provided. That is, the first pressure adjustment mechanism CA1 and the second pressure adjustment mechanism CA2 are fluidically connected to each other by the communication fluid channel HRN. The communication fluid channel HRN is provided with a communication valve VRN. The communication valve VRN is a normally closed two-position solenoid valve. When the communication valve VRN is located at the open position, the first pressure adjustment mechanism CA1 (that is, the first wheel cylinder WC1) and the second pressure adjustment mechanism CA2 (that is, the second wheel cylinder WC2) are in a communicating state. Meanwhile, when the communication valve VRN is located at the closed position, the first pressure adjustment mechanism CA1 and the second pressure adjustment mechanism CA2 are in a non-communicating state.

When the braking operation member BP is not operated, the solenoid valves VSM and VRN are located at the closed positions and the solenoid valves VM1 and VM2 are located at the open positions. Meanwhile, when the braking operation member BP is operated, the solenoid valves VSM and VRN are located at the open positions and the solenoid valves VM1 and VM2 are located at the closed positions. Further, when the vehicle wheel slip control such as an anti-skid control is performed, the solenoid valve VSM is located at the open position and the solenoid valves VRN, VM1, and VM2 are located at the closed positions.

<Pressure Adjustment Mechanism>

Figure 2:
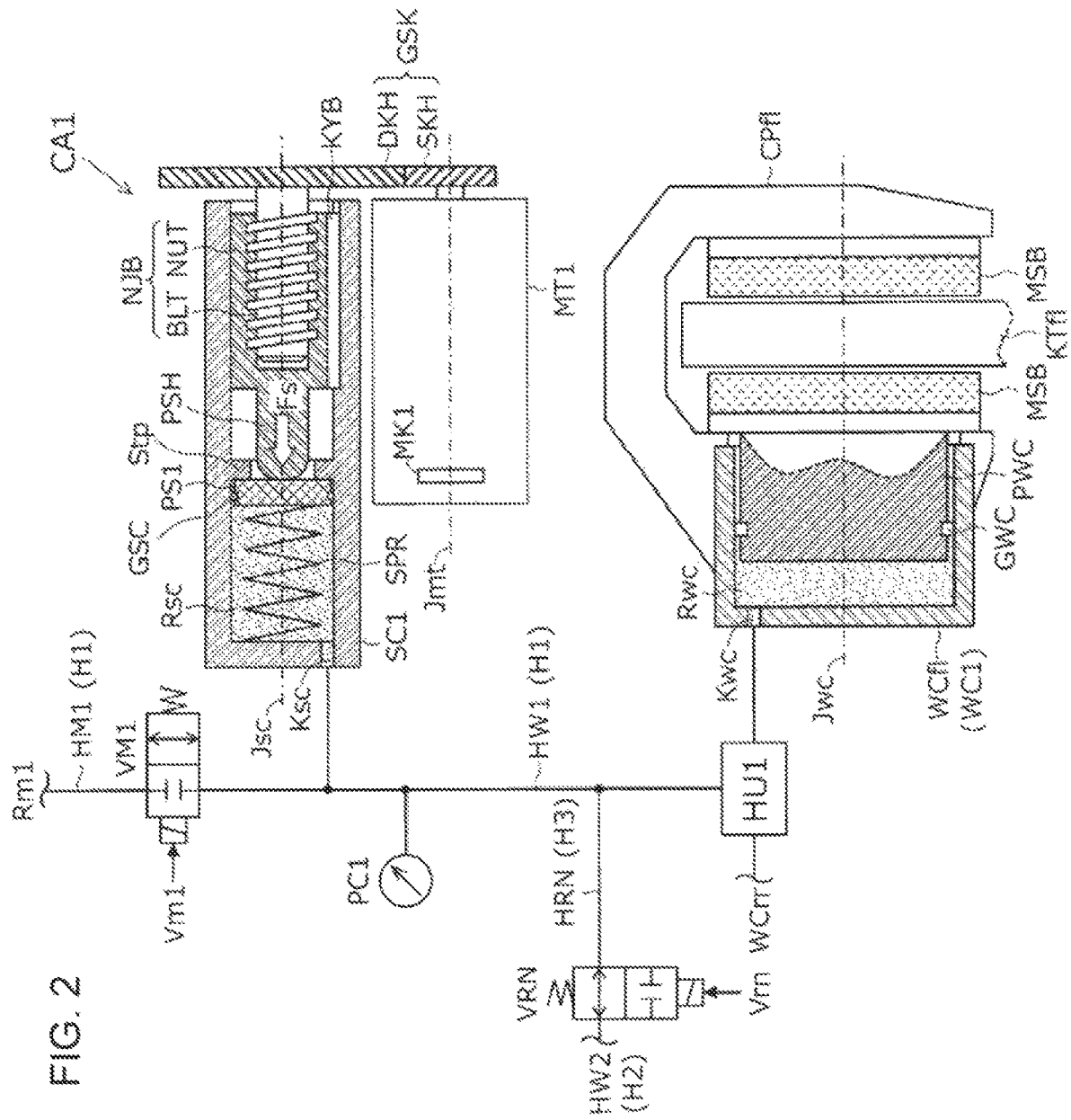
FIG. 2 is a partially cross-sectional view illustrating a pressure adjustment mechanism.

Referring to the partially cross-sectional view of FIG. 2, a detailed configuration of the pressure adjustment mechanism will be described. Since the first pressure adjustment mechanism CA1 (corresponding to, for example, the left front wheel WHfl) and the second pressure adjustment mechanism CA2 (corresponding to, for example, the right front wheel WHfr) have the same configuration, the first pressure adjustment mechanism CA1 will be described. In the same way as above, for the description of the second pressure adjustment mechanism CA2, "first" can be read as "second", the suffix number "1" can be read as "2", the suffix "fl" can be read as "fr", and the suffix "rr" can be read as "rl".

The first pressure adjustment mechanism CA1 is provided on the opposite side to the master cylinder MCL (that is, on the side of the wheel cylinder WCfl) with respect to the first master cylinder interruption valve (the solenoid valve) VM1 in the first fluid channel H1. Thus, when the solenoid valve VM1 is located at the closed position (the interruption state), the hydraulic pressure of the wheel cylinder WCfl or the like is adjusted by the flow of the brake fluid from the first pressure adjustment mechanism CA1. The first pressure adjustment mechanism CA1 includes the first electric motor MT1, a speed reducer GSK, a rotary/linear motion conversion mechanism (a screw member) NJB, a pressing member PSH, the first control cylinder SC1, a first control piston PS1, and a return spring SPR.

The first electric motor MT1 is a power source allowing the first pressure adjustment mechanism CA1 to adjust (increase, maintain, and decrease) the pressure of the brake fluid inside the wheel cylinder. The first electric motor MT1 is driven by the electronic control unit ECU. As the first electric motor MT1, a brushless DC motor (simply, also referred to as a brushless motor) can be employed.

The speed reducer GSK includes a small-diameter gear SKH and a large-diameter gear DKH. The rotation force of the electric motor MT1 is reduced by the speed reducer GSK and is transmitted to the screw member NJB. Specifically, in the speed reducer GSK, the rotation force is input from the electric motor MT1 to the small-diameter gear SKH to be reduced and is output from the large-diameter gear DKH to the screw member NJB.

In the screw member NJB, the rotation force of the speed reducer GSK is converted into a linear force Fs of the pressing member PSH. A nut member NUT is fixed to the pressing member PSH. A bolt member BLT of the screw member NJB is coaxially fixed to the large-diameter gear DKH. Since the rotary motion of the nut member NUT is restrained by a key member KYB, the nut member NUT (that is, the pressing member PSH) threaded into the bolt member BLT moves in the direction of the rotation shaft of the large-diameter gear DKH in accordance with the rotation of the large-diameter gear DKH. That is, the rotation force of the first electric motor MT1 is converted into the linear force Fs of the pressing member PSH by the screw member NJB.

The first control piston PS1 is moved by the pressing member PSH. The first control piston PS1 is inserted into an inner hole of the first control cylinder SC1 and a combination of the piston and the cylinder is formed. Specifically, the outer periphery of the first control piston PS1 is provided with a seal member GSC and hence a liquid-tightness with respect to the inner hole (the inner wall) of the first control cylinder SC1 is secured. That is, a fluid chamber (a control cylinder chamber) Rsc which is defined by the first control cylinder SC1 and the first control piston PS1 is formed. The control cylinder chamber Rsc is connected to the fluid channel (the braking pipe) HW1 through a port Ksc. Since the first control piston PS1 moves in the axial direction (a center axis Jsc), the volume of the control cylinder chamber Rsc is changed. At this time, since the first interruption valve VM1 is located at the closed position, the brake fluid does not move toward the master cylinder MCL (that is, the master cylinder chamber Rm1) and moves toward the wheel cylinder WCfl.

The first pressure adjustment mechanism CA1 is provided with the return spring (the elastic body) SPR. When the supply of the current to the first electric motor MT1 is stopped by the return spring SPR, the first control piston PS1 is returned to an initial position (a position corresponding to zero of the braking hydraulic pressure). Specifically, when a stopper portion Stp is provided inside the first control cylinder SC1 and the output of the first electric motor MT1 is zero, the first control piston PS1 is pressed by the return spring SPR to a position (the initial position) in which the first control piston comes into contact with the stopper portion Stp.

The brake caliper (simply, also referred to as a caliper) CPfl is of a floating type and is provided with the wheel cylinder WCfl. A wheel piston PWC is inserted into the inner hole of the wheel cylinder WCfl so that a combination of the piston and the cylinder is formed. The outer periphery of the wheel piston PWC is provided with a seal member GWC and hence the liquid-tightness between the seal member GWC and the inner hole (the inner wall) of the wheel cylinder WCfl is secured. That is, a fluid chamber (a wheel cylinder chamber) Rwc which is defined by the wheel cylinder WCfl and the wheel piston PWC is formed by the seal member GWC of the wheel cylinder. The wheel piston PWC is connected to a friction member MSB in order to press the friction member MSB.

The wheel cylinder chamber Rwc which is formed by a combination of the wheel piston PWC and the wheel cylinder WCfl is filled with the brake fluid. Further, the fluid chamber Rwc is connected to the fluid channel (the pipe) HW1 through a port Kwc. Thus, when the first control piston PS1 moves in the direction of the center axis Jsc in a reciprocating manner by the first electric motor MT1 so that the volume of the control cylinder chamber Rsc increases or decreases, a change in pressure of the brake fluid inside the wheel cylinder chamber Rwc is generated by the inflow or discharge of the brake fluid with respect to the wheel cylinder chamber Rwc. Accordingly, a force with which the friction member (for example, the brake pad) MSB presses the rotation member (for example, the brake disc) KTfl is adjusted so that the braking torque of the vehicle wheel WHfl is controlled.

Specifically, when the first electric motor MT1 is rotationally driven in the normal rotation direction, the first control piston PS1 moves (left in the drawing) so that the volume of the control cylinder chamber Rsc decreases and the brake fluid moves from the first control cylinder SC1 to the first wheel cylinder WCfl. Accordingly, the volume of the wheel cylinder chamber Rwc increases and the pressing force of the friction member MSB with respect to the rotation member KTfl increases, so that the braking torque of the vehicle wheel WHfl increases. Meanwhile, when the first electric motor MT1 is rotationally driven in the reverse rotation direction, the first control piston PS1 moves (right in the drawing) so that the volume of the control cylinder chamber Rsc increases and the brake fluid moves from the first wheel cylinder WCfl to the first control cylinder SC1. Accordingly, the volume of the wheel cylinder chamber Rwc decreases and the pressing force of the friction member MSB with respect to the rotation member KTfl decreases, so that the braking torque of the vehicle wheel WHfl decreases.

In order to independently control the braking hydraulic pressure of each vehicle wheel by the anti-skid control, the vehicle stabilization control, or the like, the first hydraulic pressure unit HU1 is provided between the first pressure adjustment mechanism CA1 (that is, the first control cylinder SC1) and each of the wheel cylinders WCfl and WCrr. The first hydraulic pressure unit HU1 has a combination of the pressure increasing valve (the solenoid valve) and the pressure decreasing valve (the solenoid valve). When the wheel cylinder hydraulic pressure is maintained, the pressure increasing valve and the pressure decreasing valve are located at the closed positions so that the flow of the brake fluid from the first pressure adjustment mechanism CA1 into the wheel cylinder is prevented. When the wheel cylinder hydraulic pressure decreases, the pressure decreasing valve is located at the open position while the pressure increasing valve is located at the closed position and the brake fluid is returned to the master reservoir RSV. Further, when the wheel cylinder hydraulic pressure increases, the pressure decreasing valve is located at the closed position and the pressure increasing valve is located at the open position so that the brake fluid flows from the first pressure adjustment mechanism CA1 into the wheel cylinder.

In the first fluid channel (the braking pipe) HW1, the hydraulic pressure sensor (the first control hydraulic pressure sensor) PC1 for the first control cylinder is provided between the first master cylinder interruption valve VM1 and the first hydraulic pressure unit HU1. The hydraulic pressure (the first control hydraulic pressure) Pc1 output from the first control cylinder SC1 is acquired (detected) by the first control hydraulic pressure sensor PC1.

The first fluid channel (the braking pipe) HW1 between the first master cylinder interruption valve VM1 and the first hydraulic pressure unit HU1 is connected to the communication fluid channel (the braking pipe) HRN through the second fluid channel (the braking pipe) HW2. The communication valve VRN is provided in the course of the communication fluid channel HRN. The communication fluid channel HRN is in the communicating state when the communication valve VRN is located at the open position and the communication fluid channel HRN is in the interruption state when the communication valve is located at the closed position. Thus, it is possible to selectively switch the fluidic connection (the communication/non-communication) between the first wheel cylinder WC1 (that is, the first pressure adjustment mechanism CA1) and the second wheel cylinder WC2 (that is, the second pressure adjustment mechanism CA2) by opening or closing the communication valve VRN.

When the braking operation member BP is not operated, the interruption valves VM1 and VM2 are located at the open positions so that the master cylinder MCL communicates with the master reservoir RSV. Thus, the hydraulic pressure inside each wheel cylinder becomes an atmospheric pressure. In this case, the pressing member PSH which is driven by the first electric motor MT1 is returned to the initial position (the zero point of the first electric motor MT1). Since the pressing member PSH and the first control piston PS1 are separate members, there is a case in which the first control piston PS1 may not be returned due to the friction of the seal member GSC or the like. However, the first control piston PS1 is returned to a position (the initial position) in which the first control piston comes into contact with the stopper portion Stp by the elastic force of the return spring SPR.

<Process of Electronic Control Unit ECU>

Figure 3:
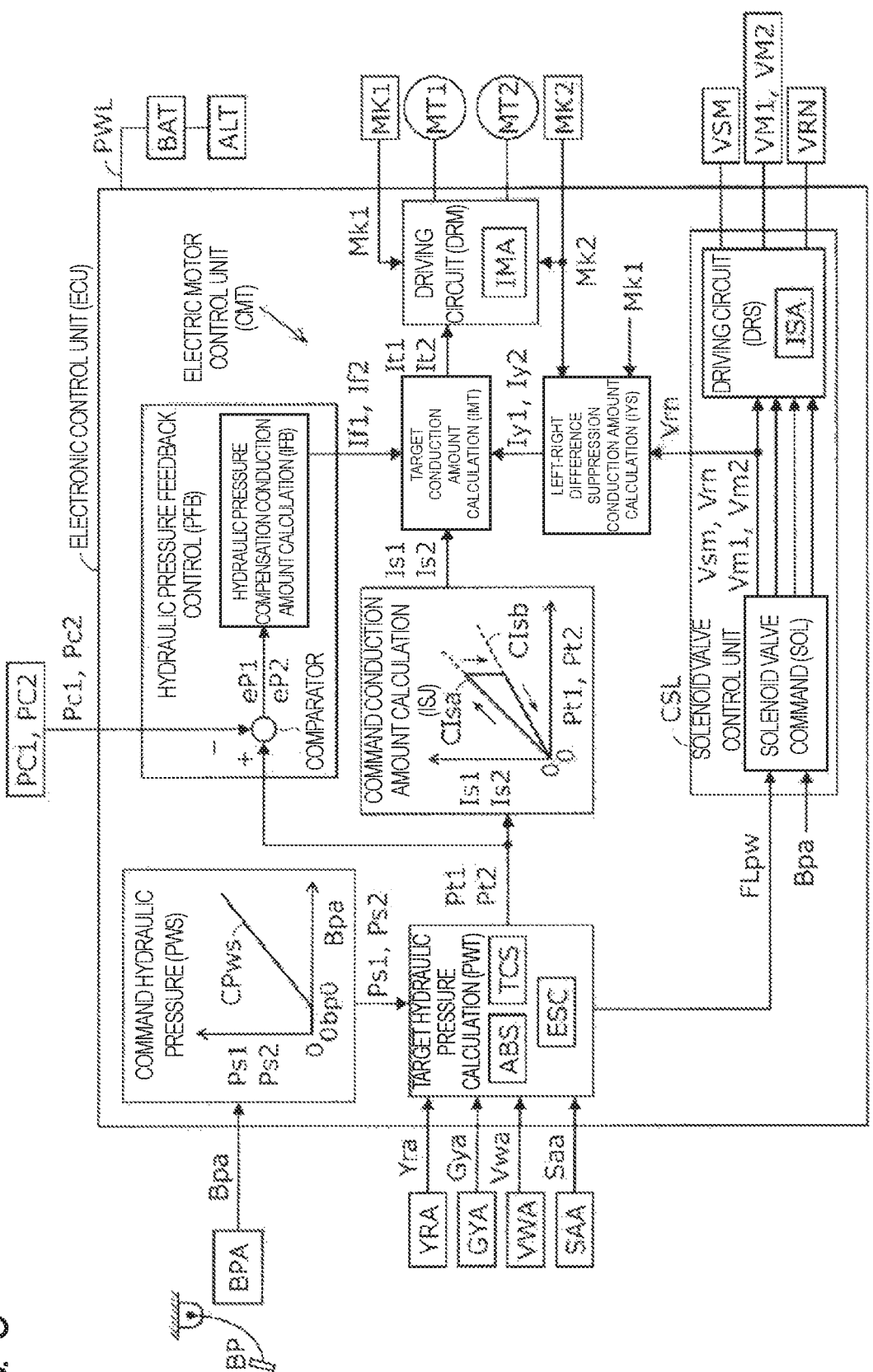
FIG. 3 is a functional block diagram illustrating a calculation process of an electronic control unit.

Next, a process of the electronic control unit (also referred to as a controller) ECU will be described with reference to the functional block diagram of FIG. 3. The electronic control unit ECU controls the first and second electric motors MT1 and MT2, the simulator interruption valve VSM, the first and second master cylinder interruption valves VM1 and VM2, and the communication valve VRN by receiving power from the power source (the battery BAT or the generator ALT). The process of the electronic control unit ECU is realized by an electric motor control unit CMT and a solenoid valve control unit CSL.

«Electric Motor Control Unit CMT»

The electric motor control unit CMT is a part of the controller ECU. The motor control unit CMT includes a command hydraulic pressure calculation block PWS, a target hydraulic pressure calculation block PWT, a command conduction amount calculation block ISJ, a hydraulic pressure feedback control block PFB, a left-right difference suppression conduction amount calculation block IYS, and a target conduction amount calculation block IMT.

In the command hydraulic pressure calculation block PWS, the first and second command hydraulic pressures Ps1 and Ps2 are calculated based on the braking operation amount Bpa and a calculation characteristic (the calculation map) CPws. Here, the first and second command hydraulic pressures Ps1 and Ps2 are the target values of the braking hydraulic pressures generated by the first and second pressure adjustment mechanisms CA1 and CA2. Specifically, in the calculation characteristic CPws, when the braking operation amount Bpa is in the range of "0 (which is zero and corresponds to a case in which the braking operation is not performed)" or more to a value smaller than a prescribed value bp0, the first and second command hydraulic pressures Ps1 and Ps2 are calculated to be zero. Then, when the operation amount Bpa is the prescribed value bp0 or more, the command hydraulic pressures Ps1 and Ps2 are calculated to increase from zero in accordance with an increase in the operation amount Bpa. Here, the value bp0 is a prescribed value corresponding to the "allowance" of the braking operation member BP.

In the target hydraulic pressure calculation block PWT, the first and second command hydraulic pressures Ps1 and Ps2 are corrected and the final target values Pt1 and Pt2 for the braking hydraulic pressures of the first and second pressure adjustment mechanisms CA1 and CA2 are calculated. Specifically, the target hydraulic pressure calculation block PWT includes an anti-skid control block ABS, a traction control block TCS, and a vehicle stabilization control block ESC and the first and second target hydraulic pressures Pt1 and Pt2 necessary for performing the anti-skid control, the traction control, and the vehicle stabilization control are calculated. Thus, there is a case in which the first target hydraulic pressure Pt1 may be different from the second target hydraulic pressure Pt2. In addition, when there is no need to perform the anti-skid control, the traction control, and the vehicle stabilization control, the first and second command hydraulic pressures Ps1 and Ps2 are not corrected and are output as the first and second target hydraulic pressures Pt1 and Pt2 from the target hydraulic pressure calculation block PWT. Further, in the target hydraulic pressure calculation block PWT, a vehicle speed Vxa is calculated based on the acquired result (the vehicle wheel speed Vwa) of the vehicle wheel speed sensor VWA provided in each vehicle wheel.

In the anti-skid control block ABS, the first and second target hydraulic pressures Pt1 and Pt2 for performing the anti-skid control that prevents the vehicle wheel lock state are calculated based on the acquired result (the vehicle wheel speed Vwa) of the vehicle wheel speed sensor VWA provided in each vehicle wheel. Specifically, in the anti-skid control block ABS, the vehicle wheel slip state amount Slp (a control variable indicating the deceleration slip state of the vehicle wheel) is calculated based on the acquired result (the vehicle wheel speed) Vwa of the vehicle wheel speed sensor VWA of each vehicle wheel. Then, the first and second command hydraulic pressures Ps1 and Ps2 are corrected based on the vehicle wheel slip state amount Slp and the first and second target hydraulic pressures Pt1 and Pt2 are determined.

Similarly, in the traction control block TCS, the first and second target hydraulic pressures Pt1 and Pt2 for performing the traction control that suppresses the spin (over rotation) of the vehicle wheel are calculated based on the acquired result (the vehicle wheel speed Vwa) of the vehicle wheel speed sensor VWA. Specifically, the first and second target hydraulic pressures Pt1 and Pt2 are determined based on the vehicle wheel slip state amount Slp (a control variable indicating the acceleration slip state of the vehicle wheel).

Further, in the vehicle stabilization control block ESC, the first and second target hydraulic pressures Pt1 and Pt2 for performing the vehicle stabilization control are calculated in order to maintain the stability of the vehicle based on the acquired result (a steering angle Saa, a yaw rate Yra, and a lateral acceleration Gya) of a steering angle sensor SAA and the vehicle behavior sensor (the yaw rate sensor YRA and the lateral acceleration sensor GYA). Specifically, the first and second command hydraulic pressures Ps1 and Ps2 are corrected in order to suppress at least one of excessive understeer and oversteer of the vehicle based on the steering angle Saa, the yaw rate Yra, the lateral acceleration Gya, and the vehicle speed Vxa and the first and second target hydraulic pressures Pt1 and Pt2 are determined.

In the target hydraulic pressure calculation block PWT, "1" of a signal FLpw is output when any one of the anti-skid control, the traction control, and the vehicle stabilization control is performed. Here, the anti-skid control, the traction control, and the vehicle stabilization control are generally referred to as the "vehicle wheel slip control". The signal FLpw is a so-called control flag and "1" is calculated as the control flag FLpw when the vehicle wheel slip control is performed. Meanwhile, "FLpw=0" is calculated when the vehicle wheel slip control is not performed.

In the command conduction amount calculation block ISJ, the first and second command conduction amounts Is1 and Is2 of the first and second electric motors MT1 and MT2 driving the first and second pressure adjustment mechanisms CA1 and CA2 are calculated based on the first and second target hydraulic pressures Pt1 and Pt2 and a calculation maps CIsa and CIsb. The first and second command conduction amounts Is1 and Is2 are the target values of the conduction amounts for controlling the first and second electric motors MT1 and MT2.

The "conduction amount" is a state quantity (state variable) that controls the output torques of the electric motors MT1 and MT2. Since the electric motors MT1 and MT2 output torques which are substantially proportional to current, target current values of the electric motors MT1 and MT2 can be used as the target value of the conduction amount. Further, since a current increases when a voltage supplied to the electric motors MT1 and MT2 increases, a supply voltage value can be used as a target state variable. Furthermore, since the supply voltage value can be adjusted by the duty ratio of the pulse width modulation, the duty ratio (a ratio of a conduction time for one cycle) can be employed as a control state variable.

In the hydraulic pressure feedback control block PFB, first and second hydraulic pressure compensation conduction amounts (simply, also referred to as compensation conduction amounts) If1 and If2 of the first and second electric motors MT1 and MT2 are calculated based on the first and second target hydraulic pressures (the target values) Pt1 and Pt2 of the hydraulic pressure and the first and second actual values (the detection values) Pc1 and Pc2 of the hydraulic pressure. Here, the first and second actual hydraulic pressures Pc1 and Pc2 are the hydraulic pressure detection values (the actual hydraulic pressures) detected by the first and second control cylinder hydraulic pressure sensors PC1 and PC2. In the hydraulic pressure feedback control block PFB, the deviations eP1 and eP2 of the first and second target hydraulic pressures Pt1 and Pt2 and the first and second actual hydraulic pressures Pc1 and Pc2 are first calculated. When the first and second hydraulic pressure deviations eP1 and eP2 are differentiated and integrated and are multiplied by gains Kp (proportional gain), Kd (differential gain), and Ki (integral gain), the first and second compensation conduction amounts If1 and If2 are calculated. In the hydraulic pressure feedback control block PFB, a feedback control (PID control) based on the hydraulic pressure is performed so that the target values Pt1 and Pt2 match the actual values Pc1 and Pc2 (that is, the hydraulic pressure deviations eP1 and eP2 approach "0").

In the left-right difference suppression conduction amount calculation block IYS, the first and second left-right difference suppression conduction amounts (simply, also referred to as suppression conduction amounts) Iy1 and Iy2 are calculated so that a difference eMk between the rotational angle (the detection value) Mk1 of the first electric motor MT1 and the rotational angle (the detection value) Mk2 of the second electric motor MT2 decreases. The first rotational angle Mk1 is detected by the first rotational angle sensor MK1 provided in the first electric motor MT1. Further, the second rotational angle Mk2 is detected by the second rotational angle sensor MK2 provided in the second electric motor MT2. The first and second rotational angles Mk1 and Mk2 are input to the controller ECU. A detailed process of the left-right difference suppression conduction amount calculation block IYS will be described later.

In the target conduction amount calculation block IMT, the first and second target conduction amounts It1 and It2 corresponding to the target value of the final conduction amount are calculated based on the first and second command conduction amounts Is1 and Is2, the compensation conduction amounts If1 and If2, and the first and second suppression conduction amounts Iy1 and Iy2. Specifically, in the target conduction amount calculation block IMT, the compensation conduction amounts If1 and If2 and the first and second suppression conduction amounts Iy1 and Iy2 are added to the first and second command conduction amounts Is1 and Is2 and the sum thereof is calculated as the first and second target conduction amounts It1 and It2, that is, the first and second target conduction amounts It1 and It2 are determined as "It1=Is1+If1+Iy1" and "It2=Is2+If2+Iy2".

In the target conduction amount calculation block IMT, the signs (positive or negative values) of the target conduction amounts It1 and It2 are determined based on the rotation directions of two electric motors MT1 and MT2 (that is, the hydraulic pressure increase/decrease direction). Further, the values of the target conduction amounts It1 and It2 are calculated based on the rotation forces of the electric motors MT1 and MT2 (that is, the hydraulic pressure increase/decrease amount). Specifically, when the braking hydraulic pressure increases, the signs of the target conduction amounts It1 and It2 are calculated as positive signs (It1, It2>0) and the electric motors MT1 and MT2 are driven in the normal rotation direction. In contrast, when the braking hydraulic pressure decreases, the signs of the target conduction amounts It1 and It2 are determined as negative signs (It1, It2<0) and the electric motors MT1 and MT2 are driven in the reverse rotation direction. Further, the output torques (the rotation forces) of the electric motors MT1 and MT2 are controlled to increase as the absolute values of the target conduction amounts It1 and It2 increase and the output torques are controlled to decrease as the absolute values of the target conduction amounts It1 and It2 decrease.

In a driving circuit DRM for the electric motors MT1 and MT2, the rotation forces (output) and the rotation directions of the electric motors MT1 and MT2 are adjusted based on the target conduction amounts It1 and It2. The driving circuit DRM will be described in detail later. As described above, the electric motor control unit CMT has been described.

«Solenoid Valve Control Unit CSL»

The solenoid valve control unit CSL is also a part of the controller ECU. The solenoid valve control unit CSL is realized by a solenoid valve command block SOL and a solenoid valve driving circuit DRS. In the solenoid valve command block SOL, the command signals Vsm, Vm1, Vm2, and Vrn commanding the opening and closing states of the solenoid valves VSM, VM1, VM2, and VRN are calculated based on the braking operation amount Bpa and the control flag FLpw. In the solenoid valve driving circuit DRS, the communicating states (the open positions) and the interruption states (the closed positions) of the solenoid valves VSM, VM1, VM2, and VRN are selectively realized (controlled) based on the command signals Vsm, Vm1, Vm2, and Vrn.

In the solenoid valve command block SOL, the energized or non-energized state of each solenoid valve (VSM or the like) is controlled based on the braking operation amount Bpa. First, it is determined whether the braking operation is performed by the driver based on the operation amount Bpa. Specifically, when the operation amount Bpa is equal to or larger than the prescribed value bp0, it is determined that the "braking operation state is set (the braking operation is performed)". Then, when the operation amount Bpa is smaller than the value bp0, it is determined that the "non-braking operation state is set (the braking operation is not performed)". Here, the value bp0 is a prescribed value corresponding to the "allowance" of the braking operation member BP.

In the solenoid valve command block SOL, when the condition of the "braking operation state (that is, Bpa bp0)" is satisfied, the command signals Vsm, Vm1, Vm2, and Vrn are transmitted to the solenoid valve driving circuit DRS so as to switch the energized states of the solenoid valves VSM, VM1, VM2, and VRN. Specifically, in the case of "Bpa bp0", the solenoid valves VSM and VRN are driven in the communicating state and the solenoid valves VM1 and VM2 are driven in the interruption state based on the signals Vsm, Vm1, Vm2, and Vrn.

Further, in the solenoid valve command block SOL, the command signal Vrn is transmitted to the driving circuit DRS so as to switch the energized state of the solenoid valve VRN based on whether the "vehicle wheel slip control is performed" using the control flag FLpw. Specifically, in the case of "FLpw=0 (when the control is not performed)", the solenoid valve VRN is switched to the communicating state. However, in the case of "FLpw=1 (when the control is performed)", the solenoid valve VRN is switched to the interruption state.

In the solenoid valve driving circuit DRS, the open/closed states of the solenoid valves VSM, VM1, VM2, and VRN are actually switched based on the command signals Vsm, Vm1, Vm2, and Vrn. Further, the driving circuit DRS is provided with a conduction amount sensor (a current sensor) ISA for the solenoid valve acquiring conduction amounts Isa to the solenoid valves VSM, VM1, VM2, and VRN.

Electric power is also supplied from the power source (BAT or the like) to the electronic control unit ECU so that a function of a control calculation process or the like is exhibited. For this reason, when the power source is bad (that is, the supply power is not sufficient), the controller ECU itself does not function and power is not supplied to the electric motors MT1 and MT2 and the solenoid valves VSM, VM1, VM2, and VRN. For this reason, the normally closed solenoid valve (NC valve) is employed as the solenoid valves VSM and VRN and the normally opened solenoid valve (NO valve) is employed as the solenoid valves VM1 and VM2. As a result, when the power source is not appropriate, the communication between the master cylinder MCL and the simulator SSM is interrupted and the communication between the master cylinder MCL and the wheel cylinder is ensured. As described above, the solenoid valve control unit CSL has been described.

Three-Phase Brushless Motor and Driving Circuit Thereof (Example of Three-Phase Brushless Motor)

Figure 4:
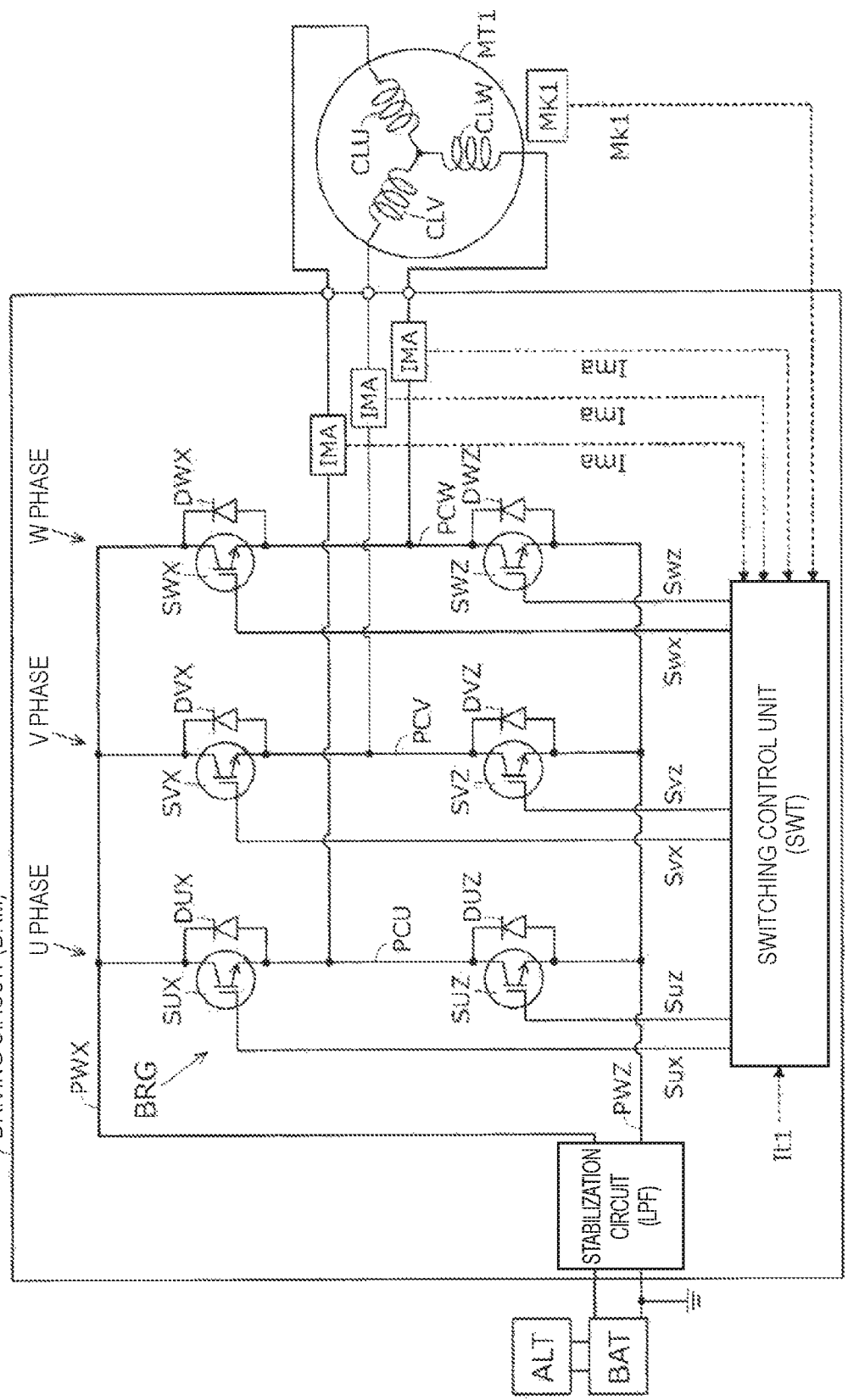
FIG. 4 is a circuit diagram illustrating an electric motor and a driving circuit thereof.

Referring to the circuit diagram of FIG. 4, an example in which a three-phase brushless motor having three coils of a U-phase coil CLU, a V-phase coil CLV, and a W-phase coil CLW is employed as the electric motors MT1 and MT2 will be described. In the brushless motor, a magnet is disposed on the side of the rotor and a coil circuit is disposed on the side of the stator. Then, a current is rotationally supplied to the brushless motor by the driving circuit according to the timing of the magnetic poles of the rotor.

Since the first and second electric motors MT1 and MT2 have the same configuration, the first electric motor MT1 will be described. The first electric motor MT1 is provided with the first rotational angle sensor MK1 which detects the first rotational angle (the rotor position) Mk1 of the electric motor MT1. As the first rotational angle sensor MK1, a hall element type sensor is employed. Further, as the first rotational angle sensor MK1, a variable reluctance type resolver can be employed. The detected rotational angle Mk1 is input to the controller ECU.

The driving circuit DRM is an electric circuit which drives the first electric motor MT1 and corresponds to a part of the controller ECU. The driving circuit DRM includes a switching control unit SWT, a three-phase bridge circuit (simply, also referred to as a bridge circuit) BRG, and a stabilization circuit LPF. The bridge circuit BRG includes six switching elements (power transistors) SUX, SUZ, SVX, SVZ, SWX, and SWZ (also referred to as "SUX to SWZ"). Based on the driving signals Sux, Suz, Svx, Svz, Swx, and Swz (also referred to as "Sux to Swz") of respective phases from the switching control unit SWT inside the driving circuit DRM, the bridge circuit BRG is driven and the output of the first electric motor MT1 is adjusted.

In the switching control unit SWT, a command value (a target value) for performing a pulse width modulation on each switching element is calculated based on the first target conduction amount It1. Based on the value of the first target conduction amount It1 and a prescribed characteristic (a calculation map), the duty ratio (a ratio of a conduction time for one cycle) of the pulse width is determined. In addition, the rotation direction of the first electric motor MT1 is determined based on the sign (the positive or negative sign) of the first target conduction amount It1. For example, as to the rotation direction of the first electric motor MT1, a positive (plus) value is set to indicate the normal rotation direction and a negative (minus) value is set to indicate the reverse rotation direction. Since the final output voltage is determined by the input voltage (the voltage of the battery BAT) and the first duty ratio Du1, the rotation direction and the output torque of the first electric motor MT1 are determined.

Further, in the switching control unit SWT, the driving signals Sux to Swz for setting the switching elements constituting the bridge circuit BRG to an on state (energized state) or an off state (non-energized state) are calculated based on the first duty ratio (the target value) Du1. By these driving signals Sux to Swz, the energized or non-energized states of the switching elements SUX to SWZ are controlled. Specifically, as the first duty ratio Du1 increases, the conduction time per unit time of the switching element increases so that a large current flows to the first electric motor MT1 and the output (the rotation force) thereof increases.

The battery BAT is connected to the input side of the three-phase bridge circuit (also referred to as an inverter circuit) BRG through the stabilization circuit LPF and the electric motor MT1 is connected to the output side of the bridge circuit BRG. In the bridge circuit BRG, three phases (U, V, and W phases) are formed by using a voltage type bridge circuit having upper and lower arms in which the switching elements are connected in series as one phase. Three-phase upper arms are connected to a power line PWX connected to a cathode side of the battery BAT. Further, three-phase lower arms are connected to a power line PWZ connected to an anode side of the battery BAT. In the bridge circuit BRG, the upper and lower arms of respective phases are connected to the power lines PWX and PWZ in parallel to the battery BAT.

In the U-phase upper arm, a flywheel diode DUX is connected to the switching element SUX in a reverse parallel state. In U-phase lower arm, a flywheel diode DUZ is connected to the switching element SUZ in a reverse parallel state. Similarly, in the V-phase upper arm, a flywheel diode DVX is connected to the switching element SVX in a reverse parallel state. In the V-phase lower arm, a flywheel diode DVZ is connected to the switching element SVZ in a reverse parallel state. Further, in the W-phase upper arm, a flywheel diode DWX is connected to the switching element SWX in a reverse parallel state. In the W-phase lower arm, a flywheel diode DWZ is connected to the switching element SWZ in a reverse parallel state. Connecting portions PCU, PCV, PCW of the upper and lower arms of respective phases form the output end (AC output end) of the bridge circuit BRG. The electric motor MT1 is connected to these output ends.

Six switching elements SUX to SWZ are elements which are able to turn on or off a part of the electric circuit. For example, MOS-FET or IGBT is employed as the switching elements SUX to SWZ. In the brushless motor MT1, the switching elements SUX to SWZ constituting the bridge circuit BRG are controlled based on the detection value Mk1 of the rotational angle (the rotor position). Then, the conduction directions (that is, the excitation directions) of the coils CLU, CLU, and CLW of three phases (U, V, and W phases) are sequentially switched and the first electric motor MT1 is rotationally driven. That is, the rotation direction (the normal rotation direction or the reverse rotation direction) of the brushless motor MT1 is determined by a relationship between the rotor and the excitation position. Here, the normal rotation direction of the electric motor MT1 is the rotation direction corresponding to an increase in the hydraulic pressure Pc1 due to the pressure adjustment mechanism CA1 and the reverse rotation direction of the electric motor MT1 is the rotation direction corresponding to a decrease in the hydraulic pressure Pc1.

A conduction amount sensor IMA which detects an actual conduction amount Ima (general name of each phase) between the bridge circuit BRG and the electric motor MT1 is provided for each of three phases. For example, a current sensor is provided as the conduction amount sensor IMA and a current value is detected as the actual conduction amount Ima. The detected conduction amount Ima of each phase is input to the switching control unit SWT.

Then, a so-called current feedback control is performed by the switching control unit SWT. Based on a deviation eIm between the actual conduction amount Ima and the first target conduction amount It1, the first duty ratio Du1 is corrected (finely adjusted). Since the actual value Ima and the target value It1 are controlled to match each other (that is, so that the conduction amount deviation eIm approaches "0") by the current feedback control, a highly accurate motor control can be achieved.

The driving circuit DRM receives power from the power source (the battery BAT, the generator ALT). In order to reduce a change in the supplied power (voltage), the driving circuit DRM is provided with the stabilization circuit LPF. The stabilization circuit LPF is formed by a combination of at least one capacitor and at least one inductor (coil) and forms a so-called LC circuit.

As the first electric motor MT1, a brush attached motor (simply, also referred to as a brush motor) can be employed instead of the brushless motor. In this case, a H-bridge circuit provided with four switching elements (power transistors) is used as the bridge circuit BRG. That is, in the bridge circuit BRG of the brush motor, one of three phases of the brushless motor is omitted. Similarly to the brushless motor, the first electric motor MT1 is provided with the rotational angle sensor MK1 and the driving circuit DRM is provided with the stabilization circuit LPF. Further, the driving circuit DRM is provided with the conduction amount sensor IMA.

As described above, the first electric motor MT1 and the driving circuit DRM thereof have been described. In the same way as above, a component in which "first" is replaced by "second" and "1" of the number of the end of the symbol is replaced by "2" corresponds to the description of the second electric motor MT2.

Process (First Example) of Left-Right Difference Minimization Control

Figure 5:
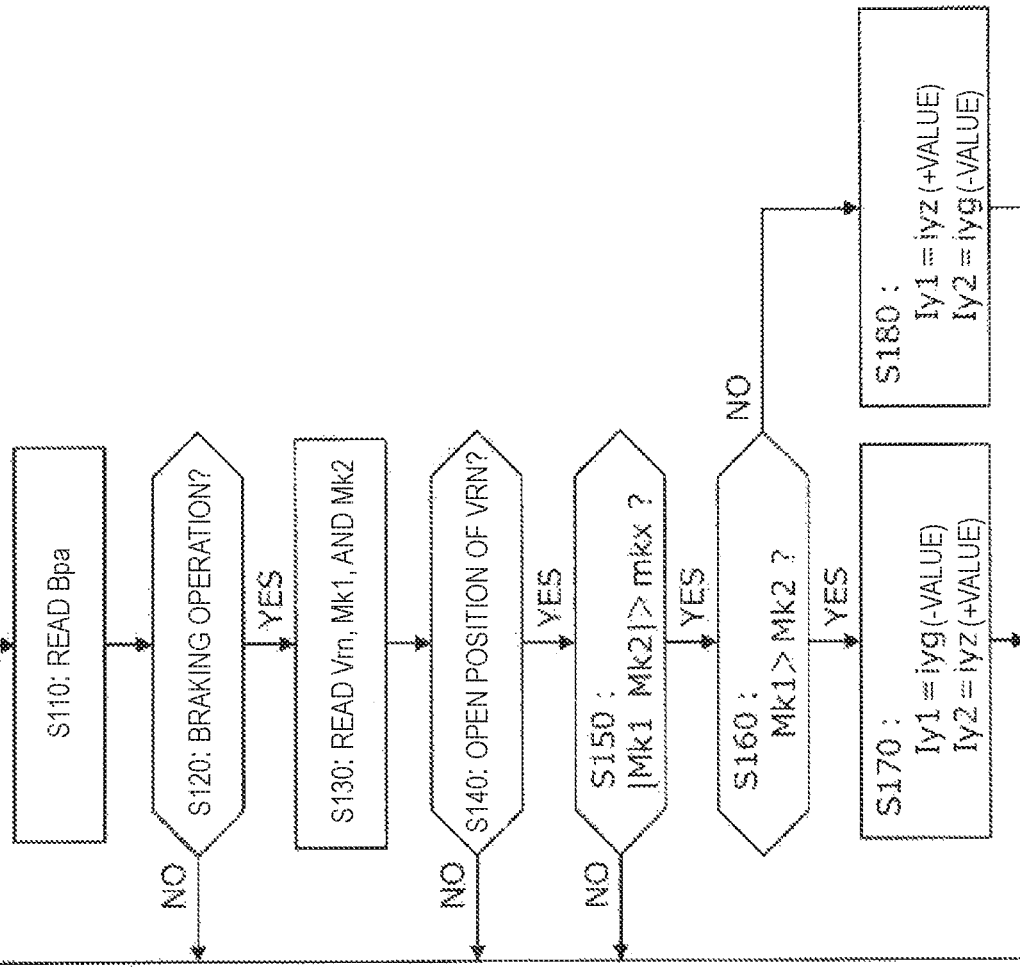
FIG. 5 is a flowchart illustrating a first example of a process of a left-right difference minimization control.

Referring to the flowchart of FIG. 5, an example (a first algorithm example) of a process of the left-right difference suppression conduction amount calculation block IYS will be described. Here, when the communication valve VRN is in the communicating state and the first rotational angle Mk1 and the second rotational angle Mk2 are different from each other, a control of decreasing the difference is performed and this control will be referred to as a "left-right difference minimization control". The rotational angle difference is generated due to the friction or the like of the pressure adjustment mechanisms CA1 and CA2. Based on the left-right difference minimization control, the first and second left-right difference suppression conduction amounts (simply, also referred to as suppression conduction amounts) Iy1 and Iy2 are calculated. The suppression conduction amounts Iy1 and Iy2 are the target values of the conduction amounts of the electric motors MT1 and MT2.

In the first example of the left-right difference minimization control, the braking operation amount Bpa is first read in step S110. Next, it is determined whether the current state is the "braking state" based on the braking operation amount Bpa in step S120. Specifically, it is determined that the current state is the "braking state" when the operation amount Bpa is equal to or larger than the prescribed value bp0. Further, it is determined that the current state is not the "braking state (the current state is the non-braking state)" when the operation amount Bpa is smaller than the prescribed value bp0. In step S120, when the determination that the current state is the "braking state" is positive (in the case of "YES"), the routine proceeds to step S130. Meanwhile, in step S120, when the determination that the current state is the "braking state" is negative (that is, in the case of the non-braking state and "NO"), the routine is returned to step S110.

In step S130, the command signal Vrn and the first and second rotational angles (the detection values) Mk1 and Mk2 are read. Next, in step S140, it is determined whether the "communication valve VRN is located at the open position (the communicating state)" based on the command signal Vrn. In step S140, when the determination that the "communication valve VRN is located at the open position" is positive (in the case of "YES"), the routine proceeds to step S150. Meanwhile, in step S140, when the determination that the "communication valve VRN is located at the open position" is negative (that is, in the case of "FLpw=1" and "NO"), the routine is returned to step S110.

In step S150, it is determined whether the "difference (the rotational angle difference) eMk between the first rotational angle Mk1 and the second rotational angle Mk2 (the absolute value) is larger than a prescribed value mkx". When the relationship of "|Mk1−Mk2|>mkx" is satisfied and the condition in step S150 is positive (in the case of "YES"), the routine proceeds to step S160. Meanwhile, when the relationship of "|Mk1−Mk2|≤mkx" is satisfied and the condition in step S150 is negative (in the case of "NO"), the routine is returned to step S110. Here, the value mkx is a prescribed determination value.

In step S160, it is determined whether the "first rotational angle Mk1 is larger than the second rotational angle Mk2". When a relationship of "Mk1>Mk2" is established and a condition in step S160 is positive (in the case of "YES"), the routine proceeds to step S170. Meanwhile, when a relationship of "Mk1<Mk2" is established and a condition in step S160 is negative (in the case of "NO"), the routine proceeds to step S180.

In step S170, at least one of an "operation of setting the first suppression conduction amount Iy1 as a prescribed value iyg (a negative sign value)" and an "operation of setting the second suppression conduction amount Iy2 as a prescribed value iyz (a positive sign value)" is performed. A condition required for performing a process of step S170 is that the communication valve VRN is located at the open position (the communicating state) and the first rotational angle Mk1 is larger than the second rotational angle Mk2 by a prescribed value mkx. In the target conduction amount calculation block IMT, the first and second suppression conduction amounts Iy1 and Iy2 are added to the first and second command conduction amounts Is1 and Is2 or the like, but at least one of an "operation of setting the first suppression conduction amount Iy1 as a minus prescribed value iyg" and an "operation of setting the second suppression conduction amount Iy2 as a plus prescribed value iyz" is employed. That is, at least one of an "operation of correcting the first target conduction amount It1 (the target conduction amount of the electric motor corresponding to a larger rotational angle) to decrease the first target conduction amount It1 by the first suppression conduction amount Iy1" and an "operation of correcting the second target conduction amount It2 (the target conduction amount of the electric motor corresponding to a smaller rotational angle) to increase the second target conduction amount It2 by the second suppression conduction amount Iy2" is performed. Here, the values iyg and iyz are prescribed conduction amount values.

When a value of any one of the first and second suppression conduction amounts Iy1 and Iy2 is not determined by the prescribed values iyg and iyz, the one value is set to "0". That is, in the process of step S170, at least one of "1:

Iy1=iyg (It1 is corrected to decrease), Iy2=0 (It2 is not corrected)", "2: Iy1=0 (It1 is not corrected), Iy2=iyz (It2 is corrected to increase)", and "3: Iy1=iyg (It1 is corrected to decrease), Iy2=iyz (It2 is corrected to increase)" is determined. Since the first and second target conduction amounts It1 and It2 are corrected so that the difference eMk between the first rotational angle Mk1 and the second rotational angle Mk2 decreases by the process of step S170, the positions of the first and second control pistons PS1 and PS2 of the first and second pressure adjustment mechanisms CA1 and CA2 can be set to appropriate positions.

Step S180 is a process corresponding to a case opposite to step S170 (the case of "Mk1<Mk2"). That is, in step S180, at least one of an "operation of determining the first suppression conduction amount Iy1 as a prescribed value iyz (a positive sign value)" and an "operation of determining the second suppression conduction amount Iy2 as a prescribed value iyg (a negative sign value)" is performed. A condition required for performing a process of step S180 is that the communication valve VRN is located at the open position (the communicating state) and the second rotational angle Mk2 is larger than the first rotational angle Mk1 by the prescribed value mkx. For this reason, at least one of an "operation of correcting the first target conduction amount It1 (the target conduction amount of the electric motor corresponding to a smaller rotational angle) to increase the first target conduction amount It1 by the first suppression conduction amount Iy1" and an "operation of correcting the second target conduction amount It2 (the target conduction amount of the electric motor corresponding to a larger rotational angle) to decrease the second target conduction amount It2 by the second suppression conduction amount Iy2" is performed.

The prescribed values iyg and iyz can be adjusted based on the value of the difference (the rotational angle difference) eKm between the first rotational angle Mk1 and the second rotational angle Mk2 (the absolute value). Specifically, the absolute values of the prescribed values iyg and iyz are adjusted to increase as the absolute value of the rotational angle difference eKm increases. That is, an increase correction amount and a decrease correction amount of the target conduction amounts It1 and It2 using the suppression conduction amounts Iy1 and Iy2 become larger as the rotational angle difference eKm increases.

Additionally, a case in which step S150 is negative corresponds to a case in which the rotational angle difference eMk exists between the first rotational angle Mk1 and the second rotational angle Mk2 and the difference eMk is equal to or smaller than the prescribed value mkx. Since the difference between the first rotational angle Mk1 and the second rotational angle Mk2 is not so large as to be required, the left-right difference minimization control of step S170 and step S180 is not performed and the routine is returned to step S110.

When the communication valve VRN is in the communicating state and the difference eMk between the first rotational angle Mk1 and the second rotational angle Mk2 is larger than the prescribed value mkx, at least one of an "operation of correcting the target conduction amount of the electric motor corresponding to a larger detection value of the rotational angle to decrease the target conduction amount" and an "operation of correcting the target conduction amount of the electric motor corresponding to a smaller detection value of the rotational angle to increase the target conduction amount" by the first and second suppression conduction amounts Iy1 and Iy2 is performed as the left-right difference minimization control. For this reason, when the communication valve VRN is located at the open position, the rotational angle difference caused by the left-right difference of the efficiency of the like is suppressed and the positions of the control pistons PS1 and PS2 are appropriately set (are equalized in the left and right vehicle wheels). As a result, the vehicle wheel slip control starts and an appropriate hydraulic pressure can be obtained by the pressure adjustment mechanisms CA1 and CA2 when the communication valve VRN is located at the closed position. In addition, the braking hydraulic pressure changes as a result of the suppression conduction amounts Iy1 and Iy2, but the change is compensated by the hydraulic pressure feedback control.

Process (Second Example) of Left-Right Difference Minimization Control

Figure 6:
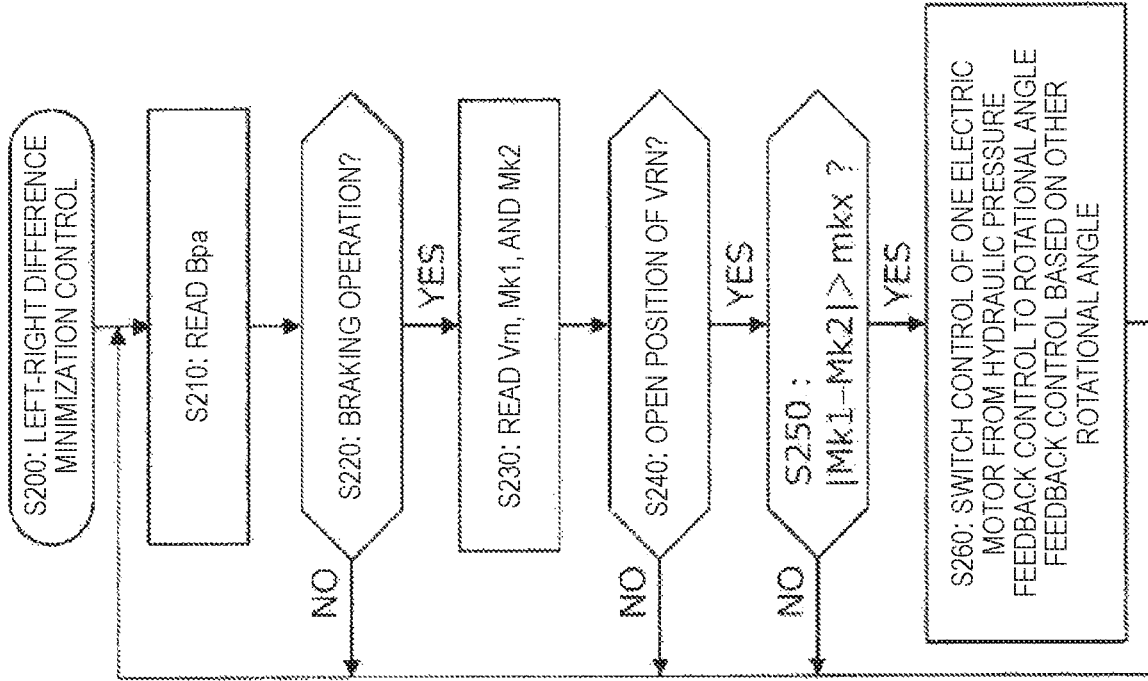
FIG. 6 is a flowchart illustrating a second example of the process of the left-right difference minimization control.

Referring to the flowchart of FIG. 6, another example (a second algorithm example) of a process of the left-right difference suppression conduction amount calculation block IYS will be described. In the first example, the suppression conduction amounts Iy1 and Iy2 are determined by the prescribed values iyz and iyg, but in the second example, the suppression conduction amounts Iy1 and Iy2 are determined by the feedback control. Since the processes of step S210 to step S250 of the second example are the same as the processes of step S110 to step S150 of the first example, a description thereof will be omitted.

When the communication valve VRN is in the communicating state and the difference eMk between the first rotational angle Mk1 and the second rotational angle Mk2 (the absolute value) is larger than the prescribed value mkx, a process of step S260 is performed. In step S260, in the control of at least one electric motor of two electric motors MT1 and MT2, the hydraulic pressure feedback control is prohibited. Then, the rotational angle feedback control is performed based on the rotational angle detection value of the other electric motor.

The process of step S260 will be described by exemplifying a case in which the first electric motor MT1 according to the first system is employed as one electric motor and the second electric motor MT2 according to the second system is employed as the other electric motor.

First, a case in which the first rotational angle Mk1 is larger than the second rotational angle Mk2 will be described. Since the hydraulic pressure feedback control for the first electric motor MT1 is prohibited, the first compensation conduction amount If1 is calculated to "0 (zero)". Then, the rotational angle feedback control is performed based on the second rotational angle Mk2 (the control target value). Specifically, the first suppression conduction amount Iy1 is calculated so that the deviation eMk between the first rotational angle Mk1 and the second rotational angle Mk2 approaches "0" (that is, the first rotational angle Mk1 matches the second rotational angle Mk2). Here, since a relationship of "Mk1>Mk2" is satisfied, the first suppression conduction amount Iy1 is determined as a negative sign value in the rotational angle feedback control based on the second rotational angle Mk2. As a result, since the first target conduction amount It1 (the target conduction amount of the electric motor corresponding to a larger rotational angle) is corrected to decrease by the first suppression conduction amount Iy1, the braking hydraulic pressure Pc1 (=Pc2) decreases. However, the second target conduction amount It2 (the target conduction amount of the electric motor corresponding to a smaller rotational angle) is corrected to increase by the second compensation conduction amount If2 so that the second actual hydraulic pressure Pc2 matches the second target hydraulic pressure Pt2 by the hydraulic pressure feedback control of the second electric motor MT2. In this case, the left-right difference minimization control of the second electric motor MT2 is not performed and the second suppression conduction amount Iy2 is set to "0".

Next, a case in which the first rotational angle Mk1 is smaller than the second rotational angle Mk2 will be described. In the same way as above, the hydraulic pressure feedback control of the first electric motor MT1 is prohibited and is calculated to "If1=0". Since the first suppression conduction amount Iy1 is calculated so that the first rotational angle Mk1 matches the second rotational angle Mk2, the first suppression conduction amount Iy1 is determined as a positive sign value in the rotational angle feedback control based on the second rotational angle Mk2. As a result, the first target conduction amount It1 (the target conduction amount of the electric motor corresponding to a smaller rotational angle) is corrected to increase by the first suppression conduction amount Iy1 and the first actual hydraulic pressure Pc1 (=Pc2) increases. However, the second target conduction amount It2 (the target conduction amount of the electric motor corresponding to a larger rotational angle) is corrected to decrease by the second compensation conduction amount If2 so that the second actual hydraulic pressure Pc2 matches the second target hydraulic pressure Pt2 by the hydraulic pressure feedback control of the second electric motor MT2. As described above, the left-right difference minimization control of the second electric motor MT2 is not performed and "Iy2=0" is calculated.

As described above, in the second example of the left-right difference minimization control, when the communication valve VRN is in the communicating state and the difference eMk between the first rotational angle Mk1 and the second rotational angle Mk2 (the absolute value) is larger than the prescribed value mkx, the target conduction amount according to one electric motor is corrected to increase and the target conduction amount according to the other electric motor is corrected to decrease. Also by the combination of the hydraulic pressure feedback control and the rotational angle feedback control, it is possible to appropriately adjust the hydraulic pressure even when the left-right positions of the first and second control pistons PS1 and PS2 are equalized and the communication valve VRN is located at the closed position similarly to the first example.

Second Embodiment of Braking Control Device According to the Invention

Figure 7:
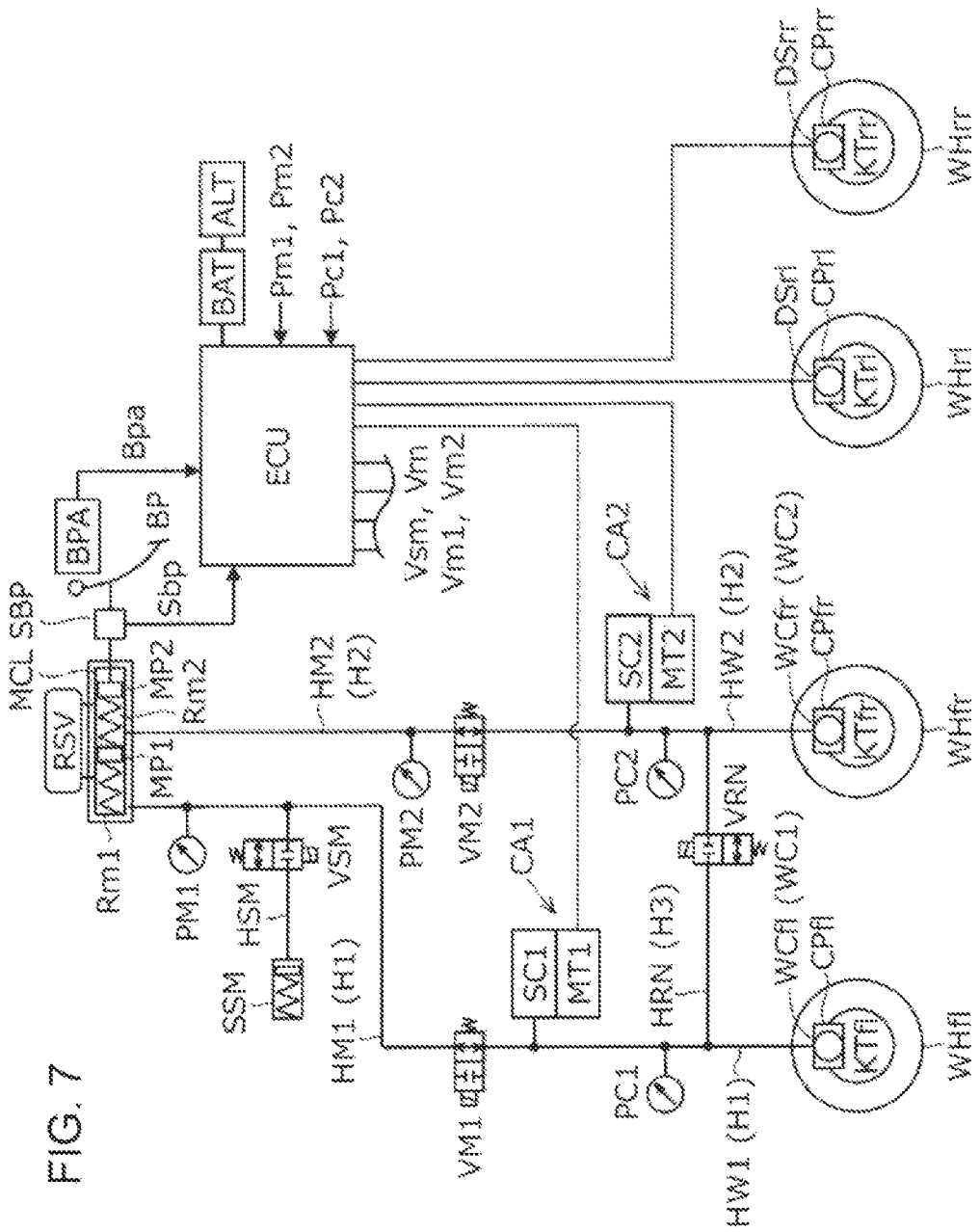
FIG. 7 is an overall configuration diagram illustrating a second embodiment of the braking control device for a vehicle according to the invention.

Next, a second embodiment of the braking control device according to the invention will be described by referring to the overall configuration diagram of FIG. 7. In the first embodiment (see FIG. 1), the wheel cylinders WCfl, WCfr, WCrl, and WCrr of four wheels are pressurized by the pressure adjustment mechanisms CA1 and CA2, but in the second embodiment, the front wheel cylinders WCfl and WCfr are pressurized by the pressure adjustment mechanisms CA1 and CA2 to generate the braking torque. Further, the rear wheels WHrl and WHrr generate the braking torque by electric braking members (electric actuators) DSrl and DSrr which does not use a fluid. Thus, the rear wheels WHrl and WHrr are not provided with the wheel cylinders WCrl and WCrr and are also not provided with a fluid pipe extending from the master cylinder MCL to the rear wheel cylinders WCrl and WCrr. That is, the fluid channel (the braking pipe), the solenoid valve, and the wheel cylinder corresponding to the rear wheel are omitted.

In the drawings and the description thereof, the members (components) indicated by the same symbols like MCL exhibit the same functions in the same way as above. In addition, the suffixes attached to the ends of the symbols of the components indicate the location of four vehicle wheels in the same way as above. The suffixes are expressed such that "fl" indicates the "left front wheel", "fr" indicates the "right front wheel", "rl" indicates the "left rear wheel", and "rr" indicates the "right rear wheel". Since the components indicated by the same reference numerals are the same as those of the first embodiment, a difference will be mainly and simply described.

The master cylinder MCL (the first hydraulic pressure chamber Rm1) and the left front wheel cylinder (corresponding to the first wheel cylinder WC1) WCfl are connected to the first fluid channel H1. The first interruption valve VM1 which is the two-position solenoid valve is installed in the course of the first fluid channel H1. The first pressure adjustment mechanism CA1 which is driven by the first electric motor MT1 is connected to the first fluid channel H1 between the first interruption valve VM1 and the left front wheel cylinder WCfl.

Further, the master cylinder MCL (the second hydraulic pressure chamber Rm2) and the right front wheel cylinder (corresponding to the second wheel cylinder WC2) WCfr are connected to the second fluid channel H2. The second interruption valve VM2 corresponding to the two-position solenoid valve is installed in the course of the second fluid channel H2. The second pressure adjustment mechanism CA2 which is driven by the second electric motor MT2 is connected to the second fluid channel H2 between the second interruption valve VM2 and the right front wheel cylinder WCfr. Further, the master cylinder MCL is connected to the simulator SSM through the simulator valve VSM corresponding to the two-position solenoid valve.

The first pressure adjustment mechanism CA1 (that is, the first wheel cylinder WC1) and the second pressure adjustment mechanism CA2 (that is, the second wheel cylinder WC2) are fluidically connected to each other by the communication fluid channel (the braking pipe) HRN. Then, the communication valve VRN is provided in the course of the communication fluid channel HRN. When the communication valve VRN is located at the open position, the communication fluid channel HRN is in the communicating state. Meanwhile, when the communication valve is located at the closed position, the communication fluid channel HRN is in the interruption state.

Also in the second embodiment, the same effect as that of the first embodiment is obtained. That is, since the rotational angle difference eMk of the electric motor caused by the left-right difference of the efficiency or the like is suppressed when the communication valve VRN is located at the open position, the left-right positions of two control pistons PS1 and PS2 are equalized. As a result, when the vehicle wheel slip control starts and the communication valve VRN is located at the closed position, it is possible to appropriately adjust the hydraulic pressure by the first and second pressure adjustment mechanisms CA1 and CA2.

Electric Braking Member Provided in Rear Wheel of Second Embodiment

Figure 8:
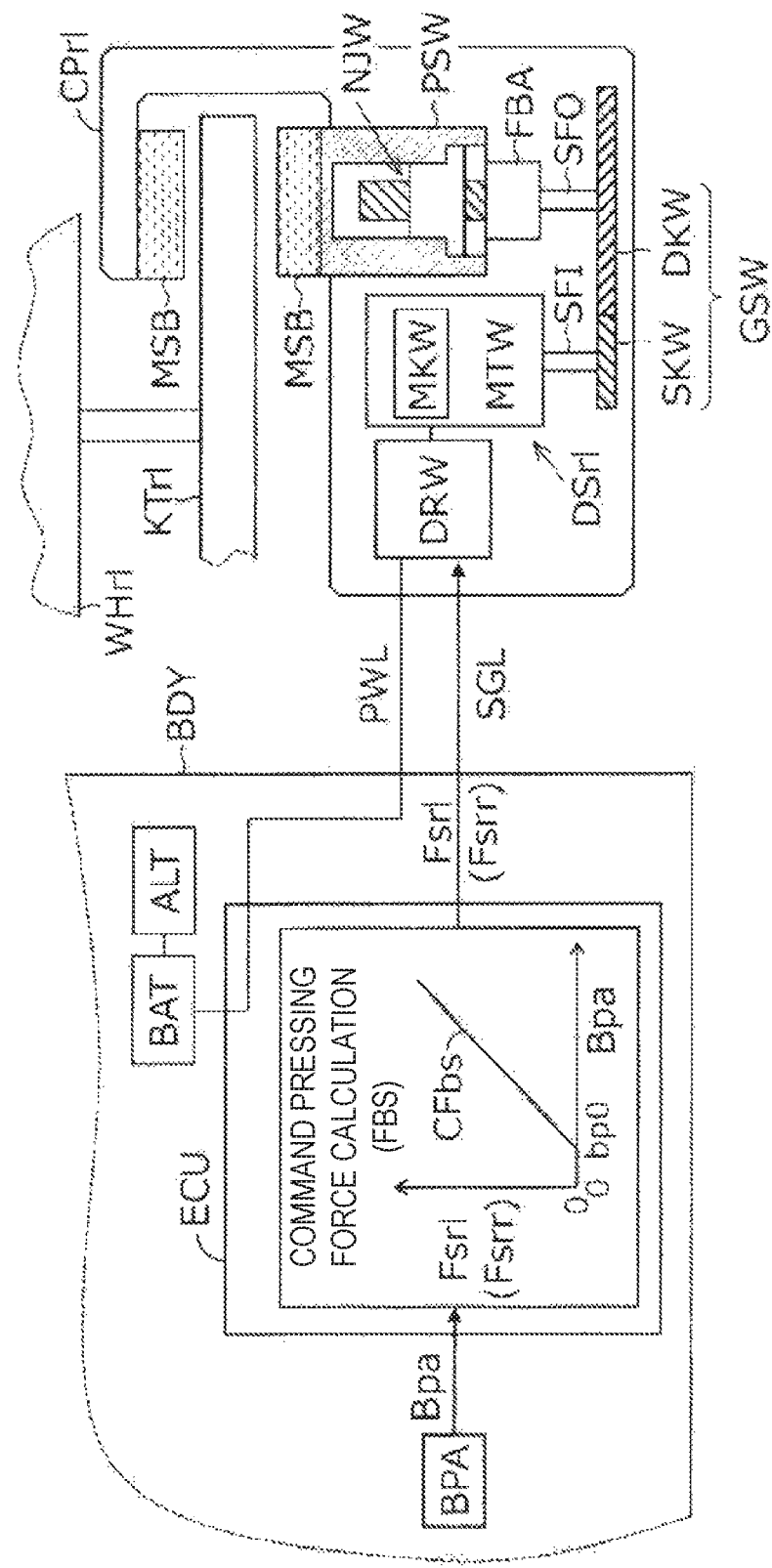
FIG. 8 is a schematic diagram illustrating an electric braking member for a rear wheel.

Referring to the schematic diagram of FIG. 8, the electric braking member (the electric actuator) provided in the rear wheel will be described by exemplifying the electric braking member DSrl for the left rear wheel. The electric braking member DSrl is driven by an electric motor MTW (that is, the braking torque of the rear wheel is adjusted). Here, the electric motor MTW is referred to as the "vehicle wheel side electric motor" in order to be distinguished from the first and second electric motors MT1 and MT2 for driving the first and second pressure adjustment mechanisms CA1 and CA2 provided in the vehicle body. Since the components indicated by the same symbols exhibit the same functions in the same way as above, a description thereof will be omitted.

The vehicle is provided with the braking operation member BP, the electronic control unit ECU, and the electric braking member (the brake actuator) DSrl. The electronic control unit ECU and the electric braking member DSrl are connected to each other by a signal line SGL and a power line PWL and power and driving signals of the electric motor MTW for the electric braking member DSrl are supplied.

The electronic control unit (the controller) ECU is provided with a command pressing force calculation block FBS. By the command pressing force calculation block FBS, a target value (a command pressing force) Fsrl for driving the electric motor MTW for the electric braking member DSrl is calculated. Specifically, in the command pressing force calculation block FBS, the command pressing force Fsrl of the right rear wheel WHrl is calculated based on the braking operation amount Bpa and a prescribed command pressing force calculation characteristic CFbs. The command pressing force Fsrl is a target value of a pressing force corresponding to a force with which the friction member (the brake pad) MSB presses the rotation member (the brake disc) KTrl in the electric braking member DSrl of the left rear wheel. The command pressing force Fsrl is transmitted to the vehicle wheel side actuator DSrl via a serial communication bus SGL.

The electric braking member DSrl of the left rear wheel includes a caliper CPrl, a pressing piston PSW, a vehicle wheel side electric motor MTW, a rotational angle sensor MKW, an input member SFI, a speed reducer GSW, an output member SFO, a screw member NJW, a pressure sensor FBA, and a driving circuit DRW.

The caliper CPrl sandwiches the rotation member (the brake disc) KTrl through two friction members (brake pads) MSB. The pressing piston (the brake piston) PSW slides inside the caliper CPrl to move forward toward or backward away from the rotation member KTrl. The pressing piston PSW presses the friction member MSB against the rotation member KTrl to generate a friction. Since the rotation member KTrl is fixed to the rear wheel WHrl, the braking force of the left rear wheel WHrl is adjusted by the friction.

The vehicle wheel side electric motor MTW for driving the electric braking member DSrl generates power of pressing the friction member MSB against the rotation member KTrl. Specifically, the output of the electric motor MTW (the rotation force around the motor shaft) is transmitted to the output member SFO through the input member SFI and the speed reducer GSW. The rotation force (the torque) of the output member SFO is converted into the linear force (the thrust in the center axis direction of the PSW) by a motion converting member (for example, the screw member) NJW and is transmitted to the pressing piston PSW.

The rotational angle sensor MKW for the vehicle wheel side electric motor MTW is provided. Further, the pressure sensor FBA is provided to acquire (detect) the force (the pressing force) Fba with which the pressing piston PSW presses the friction member MSB. Then, the pressing force feedback control is performed based on the target value Fsrl and the actual value (the detection value) Fba of the pressing force. The pressing force feedback control corresponds to the hydraulic pressure feedback control of the first embodiment.

The driving circuit DRW drives the vehicle wheel side electric motor MTW based on the command pressing force (the signal) Fsrl transmitted from the command pressing force calculation block FBS. Specifically, the driving circuit DRW is provided with the bridge circuit that drives the vehicle wheel side electric motor MTW and the rotation direction and the output torque of the electric motor MTW are controlled by the driving signals for the switching elements calculated based on the target value Fsrl.

As described above, the electric braking device DSrl of the left rear wheel WHrl has been described. Since the electric braking device DSrr of the right rear wheel WHrr is the same as the electric braking device DSrl, a description thereof will be omitted. The electric braking device DSrr can be described by replacing the suffix "rl" of various symbols by the suffix "rr".

In the first embodiment, the first and second hydraulic pressure units HU1 and HU2 are provided so that the braking torques of the vehicle wheels can be independently adjusted by the vehicle wheel slip control such as an anti-skid control. However, in the second embodiment, the first pressure adjustment mechanism CA1 can independently adjust the hydraulic pressure of the wheel cylinder WCfl and the second pressure adjustment mechanism CA2 can independently adjust the hydraulic pressure of the wheel cylinder WCfr. Thus, in the second embodiment, the first and second hydraulic pressure units HU1 and HU2 can be omitted.

The invention claimed is:
1. A braking control device for a vehicle comprising:
   an operation amount sensor which detects an operation amount of a braking operation member of a vehicle;
   a first wheel cylinder which applies a braking torque to one of left and right front wheels of the vehicle;
   a second wheel cylinder which applies a braking torque to the other of the left and right front wheels;
   a first pressure adjustment mechanism which pressurizes a brake fluid inside the first wheel cylinder by a first electric motor;
   a second pressure adjustment mechanism which pressurizes a brake fluid inside the second wheel cylinder by a second electric motor;
   a communication valve which is installed in a communication fluid channel connecting the first wheel cylinder and the second wheel cylinder and selects a communicating state and an interruption state of the brake fluid between the first wheel cylinder and the second wheel cylinder;
   a controller which calculates first and second target current amounts based on the operation amount and controls the first and second electric motors based on the first and second target current amounts;
   a first rotational angle sensor which detects a first rotational angle of the first electric motor; and
   a second rotational angle sensor which detects a second rotational angle of the second electric motor,
   wherein when the communication valve is in a communicating state and a difference between the first rotational angle and the second rotational angle is larger than a prescribed value, the controller performs at least one of:
      an operation of adjusting the first or second target current amount corresponding to a larger one of the first rotational angle and the second rotational angle to decrease the first or second target current amount; and an operation of adjusting the first or second target current amount corresponding to a smaller one of the first rotational angle and the second rotational angle to increase the first or second target current amount.

\* \* \* \* \*